US007668950B2

(12) United States Patent
Horowitz et al.

(10) Patent No.: US 7,668,950 B2
(45) Date of Patent: Feb. 23, 2010

(54) AUTOMATICALLY UPDATING PERFORMANCE-BASED ONLINE ADVERTISING SYSTEM AND METHOD

(75) Inventors: Russell C. Horowitz, Seattle, WA (US); Peter Christothoulou, Seattle, WA (US); Ethan Caldwell, Seattle, WA (US); John Keister, Seattle, WA (US); Walter Korman, Seattle, WA (US); John Busby, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 863 days.

(21) Appl. No.: 10/947,384

(22) Filed: Sep. 23, 2004

(65) Prior Publication Data

US 2005/0097204 A1      May 5, 2005

Related U.S. Application Data

(60) Provisional application No. 60/504,963, filed on Sep. 23, 2003.

(51) Int. Cl.
*G06F 15/173*   (2006.01)
*G06F 15/16*    (2006.01)

(52) U.S. Cl. .................. 709/223; 709/217; 709/224; 707/104.1; 705/14; 705/27

(58) Field of Classification Search ......... 709/217–219, 709/223–224; 705/14, 26–27; 707/104.1
See application file for complete search history.

(56) References Cited

U.S. PATENT DOCUMENTS

| 5,960,409 | A | 9/1999 | Wexler |
| 6,061,659 | A | 5/2000 | Murray |
| 6,078,866 | A | 6/2000 | Buck et al. |
| 6,269,361 | B1 | 7/2001 | Davis et al. |
| 6,591,248 | B1 | 7/2003 | Nakamura et al. |

(Continued)

OTHER PUBLICATIONS

International Search Report; mailed on Feb. 18, 2005.
"Search Engine Marketing Firm iProspect Files Patent for Pay Per Click Advertising Bid Management Tool: Iseba", Jul. 27, 2004; http://www.iprospect.com/media/pressroom2004_07_27.htm.

(Continued)

*Primary Examiner*—Bharat N Barot
(74) *Attorney, Agent, or Firm*—Stephen M. Hertzler; Nixon Peabody, LLP

(57) ABSTRACT

A system, method, and computer program product for online advertising, including computing and dynamically updating a cost-per-click (CPC) value of an advertisement for an advertisement traffic source based on a variable; and automatically uploading and distributing the advertisement to the traffic source. The variable includes price, advertisement traffic source, and/or advertiser variables. Further embodiments include dynamically updating an advertisement listing that has a cost-per-acquisition (CPA)-based value with associated CPC or cost-per-1000 (CPM) values; and distributing the advertisement listing to an advertisement distribution network that serves the listing based on the CPC or CPM values. The distribution network includes CPC-based, CPA-based, and/or CPM-based distribution networks. Further embodiments include determining a CPC value for a CPA-based advertisement; and placing the advertisement on an advertising network at the determined CPC based on a ratio of an expected number of conversions at a CPA value divided by a number of clicks at the CPC.

29 Claims, 6 Drawing Sheets

U.S. PATENT DOCUMENTS

| | | | |
|---|---|---|---|
| 6,629,135 B1 * | 9/2003 | Ross et al. | 709/218 |
| 6,631,372 B1 | 10/2003 | Graham | |
| 6,763,334 B1 * | 7/2004 | Matsumoto et al. | 705/14 |
| 7,065,500 B2 * | 6/2006 | Singh et al. | 705/26 |
| 7,136,875 B2 * | 11/2006 | Anderson et al. | 707/100 |
| 7,349,876 B1 * | 3/2008 | Veach | 705/35 |
| 7,363,302 B2 * | 4/2008 | Lester | 707/101 |
| 7,412,406 B2 * | 8/2008 | Rosenberg | 705/14 |
| 7,428,555 B2 * | 9/2008 | Yan | 707/104.1 |
| 7,499,874 B2 * | 3/2009 | Singh et al. | 705/14 |
| 7,584,287 B2 * | 9/2009 | Schneider et al. | 709/224 |
| 2003/0055729 A1 | 3/2003 | Bezos et al. | |

OTHER PUBLICATIONS

"Findwhat.com Announces New Automated Bidding Tool—Autobid", Apr. 15, 2003 http://www.findwhat.com.

"Findwhat.com Announces Cruisecontrol—Suite of Tools to Automate Campaign Management", Apr. 17, 2003, http://www.internettrailer.com/net/marketing-conference/26709-findwhat.com.

Pam Parker; New Search Marketing Player Applies Portfolio Theory, Jun. 8, 2004 http://www.clickz.com/showPage.htm?page=3370791.

* cited by examiner

AUTOMATICALLY UPDATING PERFORMANCE-BASED ONLINE ADVERTISING SYSTEM AND METHOD

CROSS REFERENCE TO RELATED DOCUMENTS

The present invention claims benefit of priority to U.S. Provisional Patent Application Ser. No. 60/504,963 to HOROWITZ et al., entitled "PERFORMANCE-BASED ONLINE ADVERTISING SYSTEM AND METHOD," filed Sep. 23, 2003, the entire disclosure of which is hereby incorporated by reference herein.

BACKGROUND OF THE INVENTION

1. Field of the Invention

The present invention generally relates to online advertising systems and methods, and more particularly to a system and method for performance-based online advertising.

2. Discussion of the Background

In recent years, methods, such as Cost-Per-1,000 (CPM), Cost-Per-Click (CPC), and the like, have been developed for calculating charges for advertising online. The CPM method is a holdover from traditional media advertising and typically is an unreliable, underperforming, administratively burdensome and untargeted format for advertisers seeking to maximize Return-On-Investment (ROI) for online advertising campaigns. For example, the CPM method charges advertisers based solely on the number of times the advertisement is delivered on a Web page (i.e., the number of impressions). The CPM method has typically been sold on the basis of delivering traffic and branding.

The CPC method charges for advertisements based on a cost associated with each selection of or click on an advertisement. CPC is a much more accountable means of developing a price for an advertisement, such as a keyword listing, text link, phrase, banner, button, pop-up or pop-under. The CPC format charges advertisers based on the volume of end users that click on the target advertisement, where the Click-Through Rate (CTR) for the advertisement is given by the number of clicks divided by the number of impressions. Unlike the CPM format, the CPC format has not typically been sold with any premium built in for advertiser branding.

However, online advertisers have become very focused on ROI and on minimizing financial risk. Accordingly, a growing percentage of advertisers employ software tools and operational capability to track ROI on a real-time basis. As a result, the online advertising market has evolved from a largely impression-based CPM medium, where, for example, an advertiser pays for exposure, including bulk advertising purchases, to a performance-based medium, such as a CPC campaign, where an advertiser pays for end-user click-throughs to a destination site. As a result of this evolution, average advertiser ROI for online campaigns has risen for advertisers who use CPM-based and CPC-based campaigns.

Based on the higher targeted ROI potential of CPC campaigns, acquisition costs, and ROI measurement, CPC advertising has captured an increasing percentage of the advertising dollars from the CPM market. However, while CPC campaigns offer advertisers higher targeted ROI than CPM campaigns, such campaigns create challenges for advertisers. For example, an advertiser that enters into a CPC campaign must actively monitor the performance of such campaigns, carefully scrutinizing the quality of referred users, spending habits of referred users, the resulting conversion rates from any particular click source, and the daily, weekly and monthly amounts the advertiser has agreed to pay for particular keywords, phrases, text links, advertisement placements, etc. Accordingly, it is an ongoing challenge for advertisers using CPM and CPC campaigns to monitor the campaigns and translate the CPM or CPC costs into a Cost-Per-Acquisition (CPA), and compare the various net CPA numbers across the dozens or sometimes hundreds of parallel campaigns that they may be running at any given time. This ongoing analysis leads to more work on the part of the advertiser to respond to variances in the performance and the cost of such campaigns, and in adjusting the CPM or CPC as necessary on a regular or sometimes daily or even real-time basis.

SUMMARY OF THE INVENTION

Therefore, there is a need for a system and method for online advertising that addresses the above and other needs. Accordingly, the exemplary embodiments provide a system and method for providing a true cost-per-acquisition (CPA)-based advertising model where an advertiser pays only for acquisitions (and does not directly pay for the media buy). In an exemplary embodiment, the system and method generate advertisements which are automatically placed on advertisement networks, such as Enhance Interactive, Overture, etc., at prices the system determines. For example, advertisements can be generated and distributed to traffic sources on behalf of advertisers who have pre-determined a price they are willing to pay for a designated action, such as the sale of a product, the acquiring of a new customer or a new applicant. In turn, the system will determine the placement of the advertisement within distribution sources.

Accordingly, the exemplary aspects of the present invention provide a system, method, and computer program product for online advertising, including computing and dynamically updating a cost-per-click (CPC) value of an advertisement for an advertisement traffic source based on a variable; and automatically uploading and distributing the advertisement to the traffic source. The variable includes price, advertisement traffic source, and/or advertiser variables. Further embodiments include dynamically updating an advertisement listing that has a cost-per-acquisition (CPA)-based value with associated CPC or cost-per-1000 (CPM) values; and distributing the advertisement listing to an advertisement distribution network that serves the listing based on the CPC or CPM values. The distribution network includes CPC-based, CPA-based, and/or CPM-based distribution networks. Further embodiments include determining a CPC value for a CPA-based advertisement; and placing the advertisement on an advertising network at the determined CPC based on a ratio of an expected number of conversions at a CPA value divided by a number of clicks at the CPC.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Generally, the exemplary embodiments of the present invention provide a system, and method for implementing a performance-based online advertising service for advertisers that addresses the above and other needs with CPM and CPC methods, and provides the ability to advertise on a CPA basis. Advantageously, with the exemplary embodiments, the risk associated with the fluctuations in conversion costs when buying advertising on a CPC or CPM basis, for example, such as when the cost for the number of clicks and associated CPC exceeds the advertiser target CPA, can be eliminated.

Accordingly, the exemplary embodiments are directed to a system and method for implementing a performance-based online advertising service for advertisers that provides the ability to advertise on a CPA basis. The CPA format of the exemplary embodiments can include a model that creates pricing competition, wherein CPA can be an evolution of CPC advertising, as the advertiser can pay a CPA according to the demand for end users generating an event that is of value to the advertiser. In an exemplary embodiment, an event can include the signup of a new customer, a transaction, bid, click, lead, and the like, during a given period of time after accessing a target advertisement.

In an exemplary embodiment, performance-based advertising can include Paid Placement, Paid Listings, Paid Submission, Paid Inclusion, Pay-Per-Click (PPC) formats, and the like, for example, that allow advertisers to purchase click-throughs to a specified destination that are generated from advertisements. In an exemplary embodiment, such advertisements can take the form of text links, banners, search results, media files, buttons, and the like. The location or placement of advertisements delivered through the performance-based advertising of the exemplary embodiments can be determined based on the amount an advertiser is willing to pay for a keyword, phrase, text link, advertisement placement, the relevancy of a particular advertisement, and the like. For example, an advertiser who agrees to pay $0.10 per click-through on text link advertisements displayed in certain search engine results, can have the text link advertisements displayed higher in the search engine results than the text link advertisements of an advertiser who agrees to pay $0.09 per click-throughs on the same search engine results. Further exemplary embodiments can include exceptions and/or variations to such ranking, for example, by incorporating relevancy in some form, such as the amount of times an advertisement has been clicked, the applicability to a query string, and the like, into a ranking algorithm.

Figure 1:
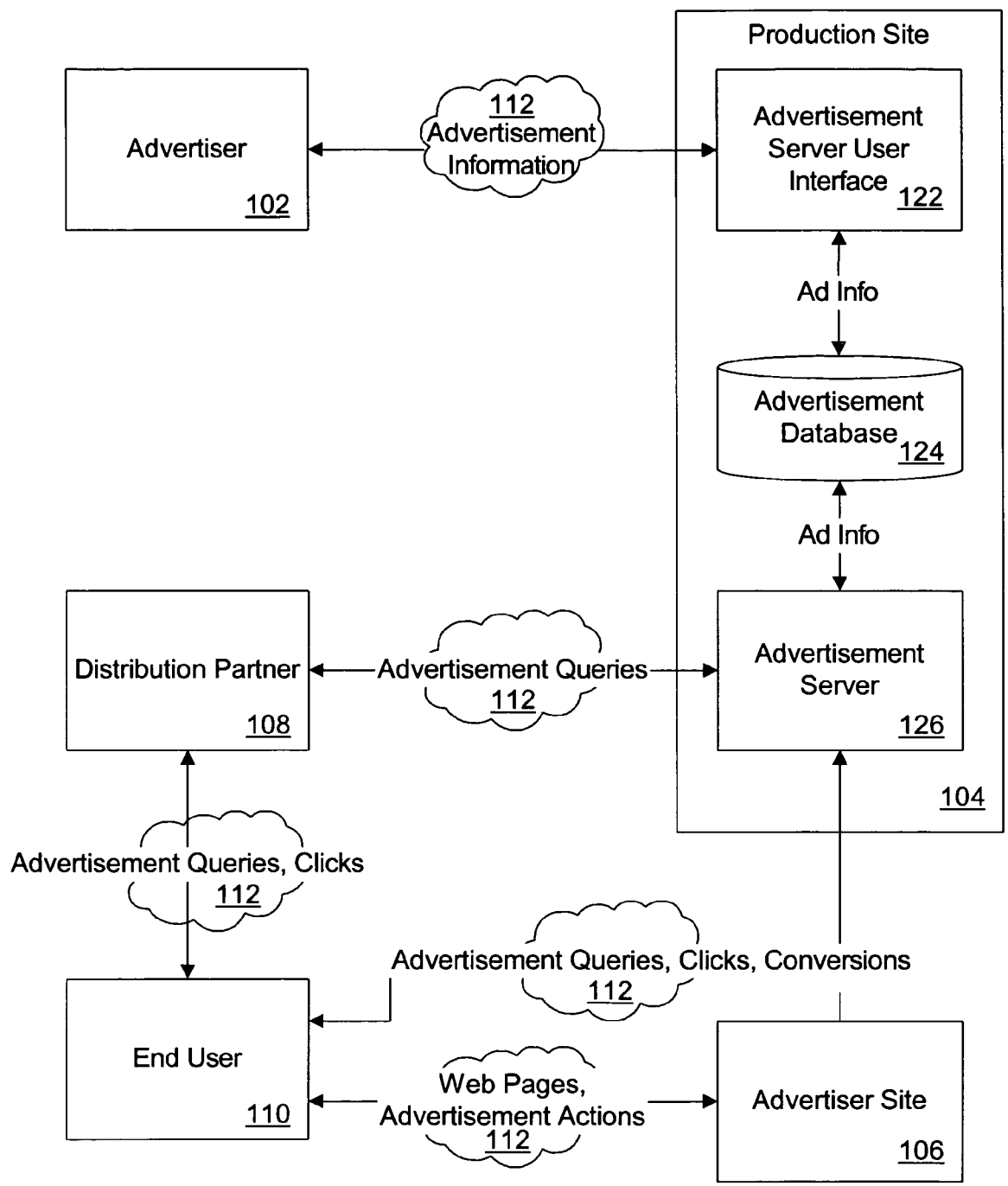
FIG. 1 illustrates a performance-based online advertising system, according to an exemplary embodiment.

Referring now to the drawings, wherein like reference numerals designate identical or corresponding parts throughout the several views, and more particularly to FIG. 1 thereof, there is illustrated an exemplary performance-based online advertising system 100. In FIG. 1, the exemplary performance-based online advertising system 100 can include one or more Advertisers 102, a Production Site 104, an Advertiser Site 106, one or more Distribution Partners 108, one or more End Users 110, and one or more computing devices thereof. The Production Site 104 can include an Advertisement Server User Interface 122, an Advertisement Database (DB) 124, and an Advertisement Server 126 that can be integrated with or separate from the Production Site 104 or third party site (e.g., Atlas, etc.). The one or more computing devices of the Advertisers 102, the Production Site 104, the Advertiser Site 106, the Distribution Partner 108, and the End Users 110 can communicate with each other over a communications network 112, such as the Internet.

In an exemplary embodiment, the Advertisement Server 126 can include software that manages the serving, recording, and the like, of advertisement information, for example, including queries, impressions, click-throughs, conversions, sign-ups, leads, sales, bids, acquisitions, and the like. In an exemplary embodiment, the Advertisement Database 124 can be configured as a back-end database that the Advertisement Server 126 and Advertisement Server User Interface 122 can interact with to store, retrieve, and the like, advertisement information, for example, including advertisement keywords, descriptive text, pricing, and the like.

In an exemplary embodiment, the Advertisement Server User Interface 122 can include any suitable software, Application Programming Interface (API), and the like, that provides facilities for the Advertiser 102 to enter an advertising campaign, set the CPA pricing (or set the necessary data to calculate the CPA) for keywords, phrases, text links, banners, buttons, pop-ups and pop-unders, and the like, associated with a particular advertisement. In an exemplary embodiment, via the Advertisement Server User Interface 122, the user can observe the progress of the campaign of the user, review clicks and other statistics for ongoing and historical campaigns, and the like.

In an exemplary embodiment, the Advertiser 102 can include one or more campaigns for a company (or companies) that wish to advertise services, products, and the like, through the Production Site 104. For example, the Advertiser 102 can include an agency entering multiple campaigns for multiple client companies. In an exemplary embodiment, the Advertiser Site 106 can include a Web site or any other relevant destination associated with advertisements that the Advertiser 102 enters into the Advertisement Server 126. For example, an Advertiser 102 can include a department store that has designed a landing page tied to a specific advertisement for shoes, etc.

In an exemplary embodiment, the Distribution Partner 108 can include an online publisher, for example, including owners and distributors of online content, search tools, and the like, that partner with the Production Site 104. The Distribution Partner 108 also may be owned and operated, in certain cases, by the Production Site 104. In an exemplary embodiment, the Distribution Partner 108 can query the Production Site 104 for advertisement listings that the Distribution Partner 108 can then integrate into Web pages, newsletters, e-mails, and the like, of the Distribution Partner 108 for serving to the End Users 110 visiting the destination of the Distribution Partner 108.

In an exemplary embodiment, the End User 110 can include a user of an Internet Web browser program, such as Internet Explorer, Netscape Navigator, and the like, or e-mail or news group software, such as Outlook, Hotmail, and the like, to view Web sites, newsletters, e-mails, and the like. In an exemplary embodiment, the Production Site 104 can include a site hosting the Advertisement Server 126, the Advertisement Server User Interface 122, the Advertisement Database 124, the associated software and hardware components, and the like.

In an exemplary embodiment, the Production Site 104 can be owned by the Production Site 104 or a Production Company, for example, including a Publisher Site, such as an online newspaper, an advertising network of Web sites, a portal, search engine or directory, and the like. In an exemplary embodiment, an Advertisement Query can include a request made by a Web server or Web browser of the Advertisement Server 126 of the Production Site 104 to retrieve advertisements. In an exemplary embodiment, the Advertisement Database 124 can include, for example, a Structured Query Language (SQL) database server to store the various types of advertisement information.

The exemplary performance-based online advertising system 100 can be employed by the Advertisers 102 to promote, market, sell, advertise, and the like, goods, services, and the like, to the End Users 110 worldwide through a Cost-Per-Acquisition/Action (CPA) Internet advertising model, and the like. In an exemplary embodiment, the advertising can be based on and include, for example, keywords, phrases, text links, banners, buttons, interstitials, pop-ups and pop-unders, and the like, and can be provided in a most efficient and cost-effective manner. Advantageously, the exemplary performance-based online advertising system 100 can deliver a very high and/or specifically targeted Return-On-Investment (ROI) for online advertising campaigns by mirroring the target acquisition cost of the Advertisers 102 and minimizing the risk and financial exposure associated with underperforming traffic for the Advertisers 102. In an exemplary embodiment, this can be accomplished by filtering out advertisements that are not making money or by the system paying less money for placement of such advertisements on the Distribution Partner 108. Thus, the exemplary performance-based online advertising system 100 can remove the delta between the actual cost of acquiring an online event (e.g., a new advertiser signup, a transaction, a bid, etc.) and what the Advertisers 102 have historically paid or are willing to pay for such an event.

In a manner similar to CPC advertising, the Advertisers 102 can provide the exemplary performance-based online advertising system 100 with keywords, phrases, text links, banners, buttons, interstitials, pop-ups and pop-unders, and the like, that are relevant to the advertisement campaigns of the Advertisers 102. However, unlike CPC advertising, the Advertisers 102 can generate advertisements based on keywords, phrases, and the like, based on the price that the Advertisers 102 are willing to pay on a per event CPA basis (e.g., thirty dollars per customer purchasing an airline ticket, ten dollars for a new customer signup, fifty dollars for a customer who makes a purchase over one thousand dollars, and the like). In an exemplary embodiment, one or more suitable algorithms or a combination thereof can be employed to determine the rankings of the advertisements for the Advertisers 102 and in turn send the aggregated results (e.g., the result set of all advertisement purchasing keywords, phrases, text links, banners, buttons, pop-ups and pop-unders, and the like, on an event CPA basis) to the Distribution Partner 108 in the form of CPA, CPC, CPM or any suitable relevant metric based on the criteria of the Distribution Partner 108. In an exemplary embodiment, such conversion of the advertisements into a CPA, CPC or other form can be performed by the Production Site 104.

In an exemplary embodiment, the Advertisers 102 using the exemplary performance-based online advertising system 100 can receive impressions for their advertisements and click-throughs to their Web site or desired destination for free and need only pay for confirmed events, such as new customer signups, bids, leads, clicks, purchases, transactions, and the like, or the completion of a desired effect for any suitable goods, service or action, such as a lead, sale, acquisition, sale over a specific amount, and the like, by the End Users 110 and as dictated by the Advertisers 102. For example, the exemplary performance-based online advertising system 100 can be configured to charge the Advertisers 102 based on any suitably trackable event, for example, including a new user sign-up, a lead, a click-through to an advertiser on the site of the Advertisers 102, a flat transaction fee, a percentage of the transaction, a bid being made on a product, a product being put up for bid, any suitable combination of the above, and the like.

The exemplary performance-based online advertising system 100 also can be configured to track leads, sales, acquisitions, deferred conversions, and the like. Deferred conversions, for example, can include users who return to a given destination subsequent to the initial session, after being directed to the destination through an advertisement of the exemplary performance-based online advertising system 100. The exemplary performance-based online advertising system 100 can be configured to charge the Advertisers 102 accordingly. For example, the Advertisers 102 can be charged a higher fee for an event that occurs within 30 minutes of the click-through, as compared to an event that happens 24-48 hours after the click-through.

In a further exemplary embodiment, information in the Advertisement Database 124 can be used to insert advertisements into one or more listing engines, advantageously, without being concerned with how such listing engines are implemented (e.g., how listing engines deliver advertisements). For example, the exemplary system need be concerned to the extent that the system is buying advertising inventory based on the ability of the corresponding advertisement traffic to convert for the advertiser. In this case, the exemplary performance-based online advertising system 100, advantageously, need not actually serve any advertisements. In addition, for the sake of efficiency and robustness, a scheduler and log processor can be employed for handling communications between the Advertisement Server 126 and the Advertisement Database 124.

The exemplary performance-based online advertising system 100 represents the next evolution of online advertising. The CPA alternative and the advertiser ranking algorithms of exemplary performance-based online advertising system 100 can capture a significant percentage of CPC and CPM advertisers and expand the existing universe of online advertisers, as the ROI potential can exceed both CPC and CPM-based formats and provide the advertiser with greater specificity of ROI. Using the exemplary performance-based online advertising system 100, advantageously, the Advertisers 102 may be willing to pay their typical CPA or greater than their typical average CPA paid in standard campaigns, for example, since the exemplary performance-based advertising system 100 eliminates most of the management costs and financial risk associated with CPM and CPC advertising formats.

Figure 2:
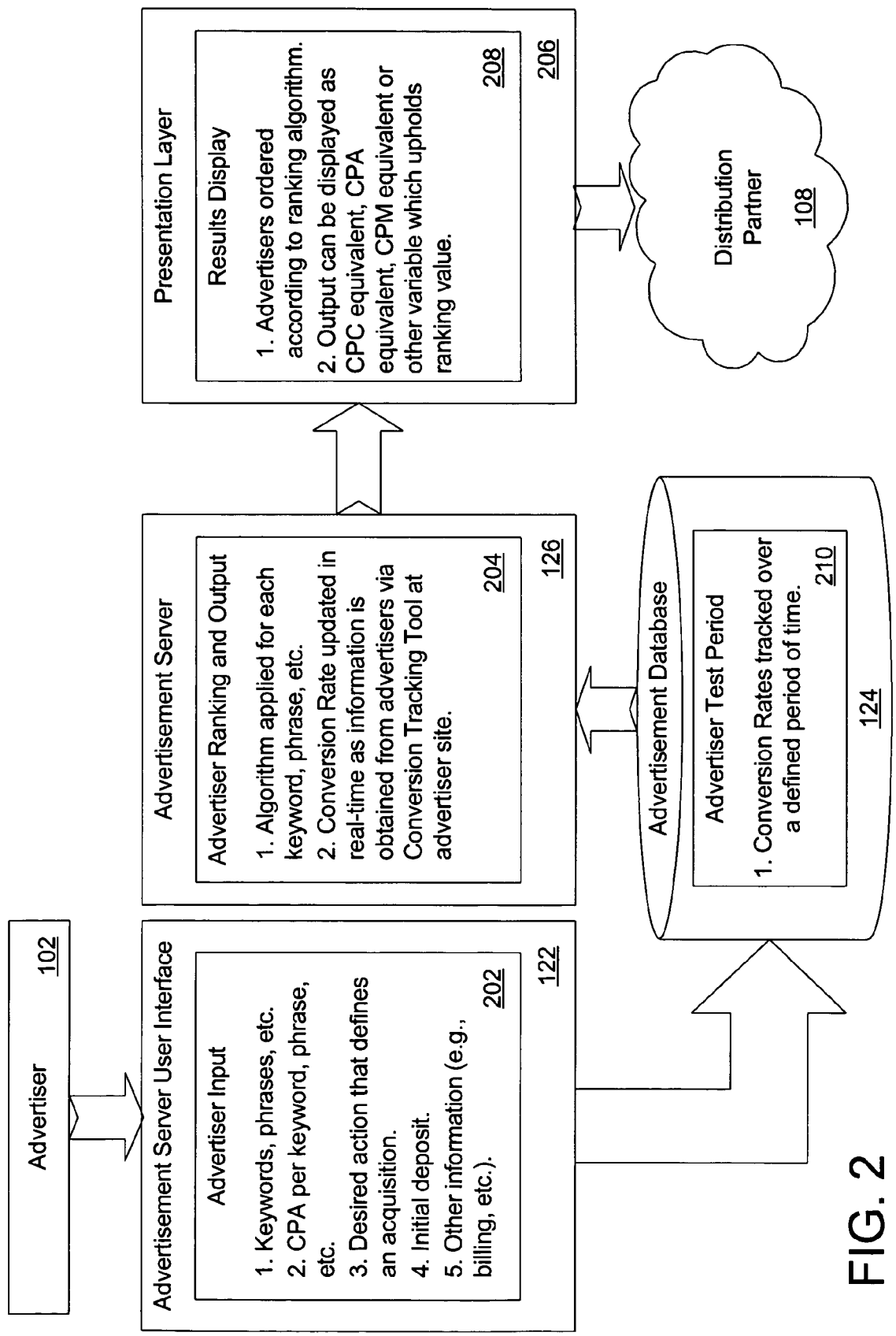
FIG. 2 illustrates exemplary processes that can be performed on the exemplary performance-based online advertising system of FIG. 1.

FIG. 2 illustrates exemplary processes that can be performed on the exemplary performance-based online advertising system 100 of FIG. 1. In FIG. 2, the Advertisers 102 can employ an Advertiser Input process 202 of the Advertiser Server User Interface 122, for example, to input keywords, phrases, etc., CPA per keyword, phrase, etc., desired action that defines CPA (e.g., a lead, a sale, acquisition, etc.), an initial deposit, daily or monthly spending caps, minimum CPA or maximum CPA (e.g., based on positioning in results) and other information (e.g., billing, etc.), and the like. The Advertiser Input process 202 can be configured to allow for direct advertisers, agencies and other advertising entities, including but not limited to individuals, to enter credit card, invoicing information, and the like. In a further exemplary embodiment, a means for fetching a tracking pixel, for example, including a unique identification (ID) to detect duplicate acquisitions, and the like, can be employed.

The Advertisement Server 126 can employ an Advertiser Ranking and Output process 204, for example, to determine an algorithm applied for each keyword, phrase, etc., to determine a Conversion Rate (e.g., for determining the CPA, CPC equivalent or CPM equivalent to be delivered to the Distribution Partner 108) that can be updated in real-time or near real-time as conversions are passed on to the Advertisement Server 126 by the Advertiser Site 106 or the End User 110, and the like. The Advertisement Database 124 can be used to implement an Advertiser Test Period process 210, for example, to track the conversion rates or clicks over a predetermined period of time (e.g., a day, a week, a month, etc.) or after a predetermined number of clicks or conversions have been recorded, and the like. A presentation layer 206 can employ a Results Display process 208, for example, to order the Advertisers 102 according to the ranking algorithm, to display output results as CPM equivalent, CPC equivalent, CPA equivalent or other variable, which upholds a ranking value, and the like. The results can be output by the presentation layer 206 to a Distribution Partner 108.

Figure 3:
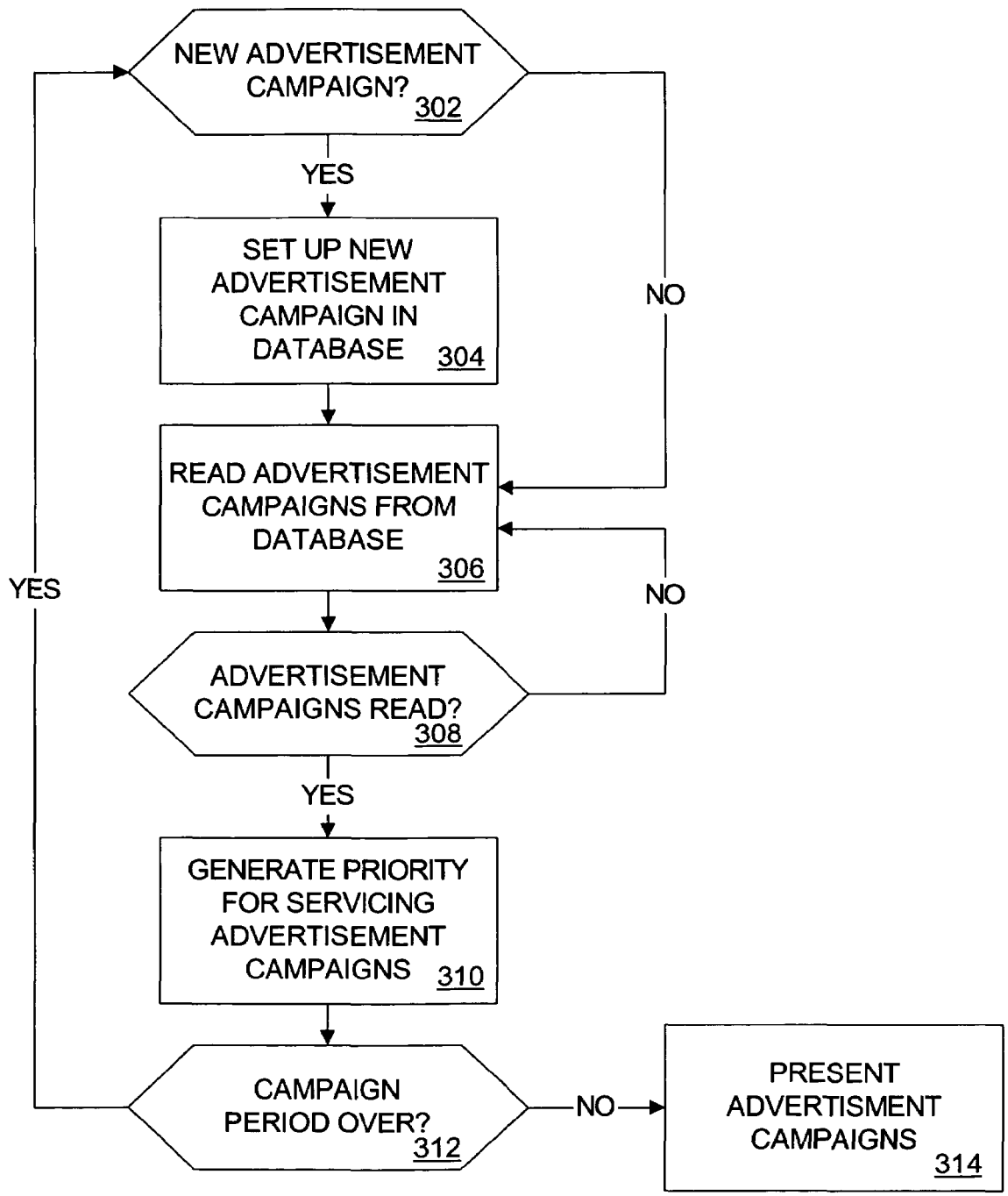
FIG. 3 is a flowchart for illustrating an exemplary process for advertisement setup and serving.

FIG. 3 is a flowchart for illustrating an exemplary process for advertisement setup and serving. In FIG. 3, advertisement setup and preparation for serving can include determining at step 302 whether or not a new advertisement campaign has been set up. If so, at step 304, the new advertisement campaign can be integrated into the Advertisement Database 124, for example, taking into account the various items entered by the Advertisers 102 into the Advertisement Server User Interface 122. Such items entered into the Advertisement Server User Interface 122 can include descriptive elements, desired keywords or categories (if applicable), an initial CPA amount (or data needed to calculate the CPA) to be paid for acquisitions derived from the campaign, and the like.

In an exemplary embodiment, the Advertiser 102 inputs can include the same basic information typically entered for a CPC campaign. However, rather than defining the CPC the Advertisers 102 are willing to pay, the Advertisers 102 determine the CPA or CPAs (or provide the data necessary to calculate the CPA or CPAs) the Advertisers 102 are willing to pay for the advertisements, and the action or actions that determine the acquisition or acquisitions. Once the relevant information of the Advertisers 102 is captured, the Advertisers 102 can then undergo a test period where the exemplary performance-based online advertising system 100 performs various analyses to determine initial advertisement placement, ranking, and the like.

At step 306, the Advertisement Server 126 can read the advertisement campaign information from the Advertisement Database 124, as determined by step 308, and which can include the test period for the Advertisers 102. Unless waived or not required by the provider of the exemplary performance-based online advertising system 100, the Advertisers 102 can undergo the initial test period for a predetermined amount of time (e.g., a day, a week, a month, etc.) or after a predetermined number of clicks or conversions have been recorded, and the like, to record accurate information that can be used to establish Conversion Rates (e.g., total click-throughs divided by total acquisitions) that are tracked by the Advertisement Server 126 of the exemplary performance-based online advertising system 100. Once the exemplary performance-based online advertising system 100 has gathered the Conversion Rate data, a suitable algorithm can be applied to determine the appropriate ranking, priority, and the like, for the Advertiser 102. In an exemplary embodiment, meta-information can be employed regarding conversion rates to determine the reliably of conversion rate data. For example, it may be determined that the conversion rate data is unreliable in which case the corresponding advertising campaign may not be run at all. When the test period has concluded, the Conversion Rates can be updated in real-time or near real-time, for example, as information is received from the Advertisers 102 and the End Users 110, summarizing the acquisitions of the Advertisers 102.

At step 310, for example, on an ongoing periodic basis, as determined by step 312, the Advertisement Server 126 can generate a new priority for serving the advertisement campaigns based on the latest advertisement serving information, for example, including queries, impressions, click-throughs, conversions, average purchase amounts, CPAs, Conversion Rates, click-through rates, rank at which the advertisements historically had been served, click-through rates when the advertisements were historically served at various ranks, relevancy, and the like.

At step 314, results of the exemplary performance-based online advertising system 100 can be presented, for example, rank-ordered, through a process whereby the CPA of each of the Advertisers 102 represents the amount each of the Advertisers 102 can pay for each acquisition generated from a click-through on an advertisement. The Advertiser 102 positioning can be determined by any suitable algorithm that assigns a rank that takes into account the CPA, the Conversion Rate, a budget of the Advertiser 102 (e.g., if the budget is limited), and the like. In an exemplary embodiment, an advertiser with the highest ranking receives first position and the remaining Advertisers 102 appear in descending order based on the aforementioned algorithm. The exemplary performance-based online advertising system 100 then can distribute the results to a distributor via CPC equivalent, CPA or any suitable alternative pricing form that establishes appropriate ranking for the Advertisers 102 based on a suitable algorithm thereof.

In an exemplary embodiment, at the time the Distribution Partner 108 calls for a set of advertisements that match some predetermined criteria, and which can take many forms, for example, including via keyword and/or phrase entry in a search box or placement on a Web page, newsletter or e-mail, the relevant advertisements can be placed in the appropriate ranking as dictated by the exemplary performance-based online advertising system 100 algorithm and distributed through the Presentation Layer 206 to the Distribution Partner 108.

In an exemplary embodiment, if the End User 110 clicks-through on an advertisement of the exemplary performance-based online advertising system 100, the exemplary performance-based online advertising system 100 can record the relevant action or actions that the user engages in on the property of the Advertisers 102. If the third party does not complete the relevant action, then no fees can be due. If, however, the third party does complete the relevant action, then the CPA that the Advertisers 102 were willing to pay for a customer on that advertisement is recorded as a debit in the accounts of the Advertisers 102.

Figure 4:
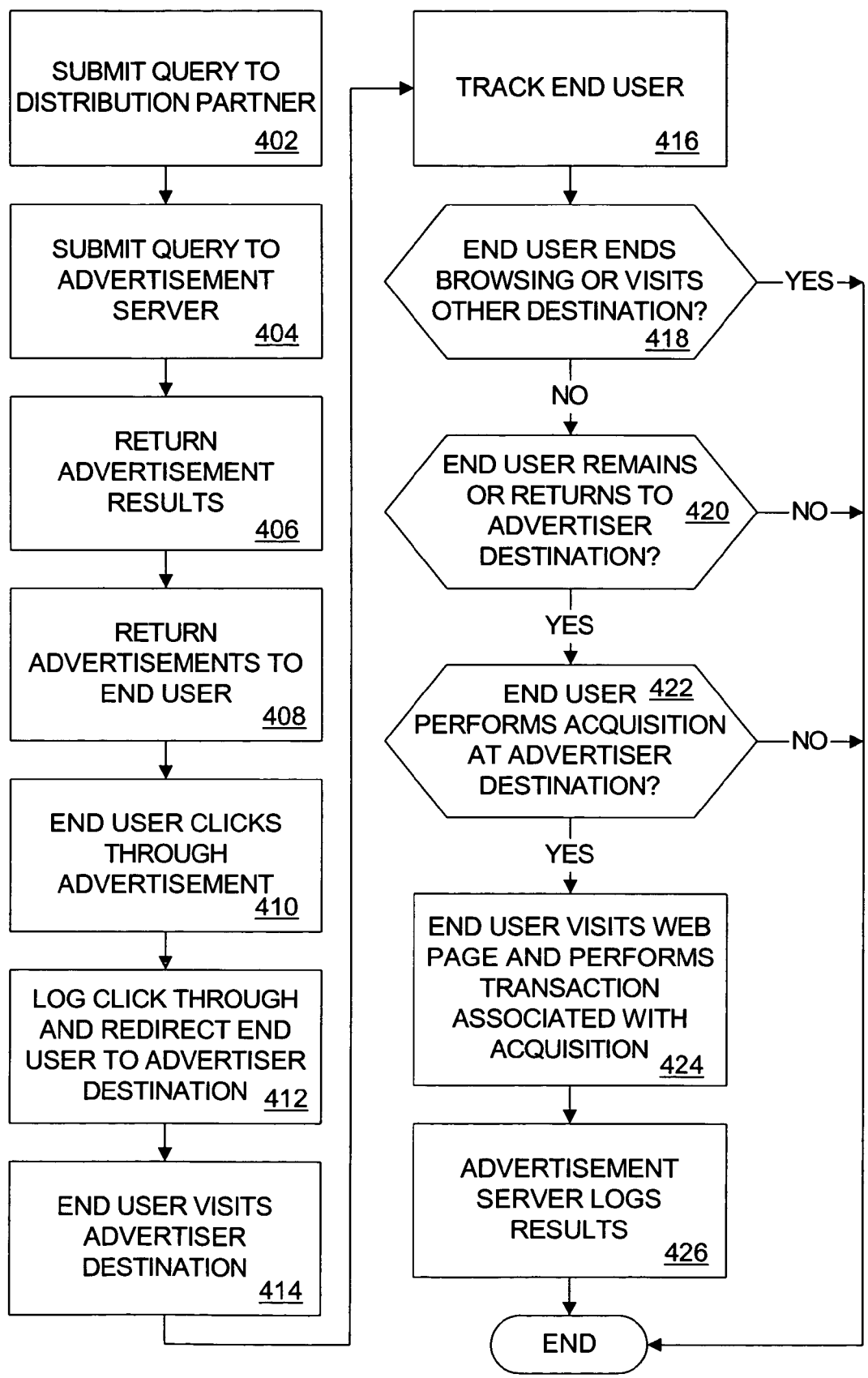
FIG. 4 is a flowchart for illustrating an exemplary process for advertisement serving.

FIG. 4 is a flowchart for illustrating an exemplary process for advertisement serving. In FIG. 4, at step 402, in an exemplary advertisement serving case, the End User 110 submits a Query to the Distribution Partner 108. In a further exemplary embodiment, the Distribution Partner 108 can serve an advertisement, for example, via a banner, hypertext link, and the like, to the End User 110, in which case the Distribution Partner 108 submits the Query to the exemplary performance-based online advertising system 100 and the End User 110 sees the advertisement via a Web page that the Distribution Partner 108 returns to the End User 110. At step 404, the Distribution Partner 108 submits the Query to the Advertisement Server 126. At step 406, the Advertisement Server 126 returns results with the advertisements chosen for display, and logs the query and associated advertisement impressions that were served. At step 408, the Distribution Partner 108 returns the advertisements to the Web browser of the End User 110. At step 410, the End User 110 clicks-through one of the advertisement links, which submits a request to the Advertisement Server 126.

At step 412, the Advertisement Server 126 can log the click-through and redirect the Web browser of the End User 110 or pop up a new Web browser for the End User 110 to the destination (e.g., Web page, landing page, and the like) of the Advertiser Site 106. At step 414, the End User 110 visits the Advertiser Site 106 and information regarding a unique advertisement click identifier, information detailing that the End User 110 originated from the Production Site 104, and the like, can be determined.

At step 416, tracking of the End User 110 can be performed. In an exemplary embodiment, the Production Site 104, and/or the Advertiser 102 perform tracking of the End User 100 by assigning a unique identifier to the End User 110 and identifying actions performed by the End User 110. In an exemplary embodiment, if the End User 110 is a new user on the Advertiser Site 106, then when the Advertiser 102 assigns the End User 110 the unique identifier, the Web browser of the End User 110 can be redirected to the Advertisement Server 126 of the Production Site 104. In a further exemplary embodiment, the Advertiser Site 106 can submit a request to the Advertisement Server 126 of the Production Site 104. The redirect or request can include the unique identifier of the End User 110 for the Advertiser Site 106, an originating advertisement query, click information, and the like.

In a still further exemplary embodiment, a unique identifier need not be assigned to the End User 110, but rather a cookie, including the advertiser ID, click ID of clicks the End User 110 has recently made, and the like, can be employed to track the End User 110. Similarly, a unique ID assigned to the End User 110 by the Advertiser Site 106 need not be employed, but rather the exemplary performance-based online advertising system 100 can assign a unique ID to the End User 110. For example, in step 412, the End User 110 can be tracked by employing a cookie having information that varies depending on the type of tracking scheme being employed or an ID can be passed in the redirect and the Advertiser site 106 can remember the ID and return it to the exemplary performance-based online advertising system 100 either in a tracking pixel request or in a direct request from the Advertisement server 126.

In an exemplary embodiment, the Advertisement Server 126, for example, can ensure that the End User 110 has a unique identifier for the Production Site 104, can store a mapping between the unique identifiers of the Advertiser Site 106 and the Production Site 104, can store originating advertisement query and click information, if necessary can redirect the Web browser of the End User 110 back to the Advertiser Site 106, and the like.

As determined at step 418, the End User 110 may or may not visit subsequent unrelated sites or may quit their Web browser. As determined at step 422, the End User 110 returns to or remains at the Advertiser Site 106. At step 424, the End User 110 performs an action on the site of the Advertiser 102 that corresponds to an event or acquisition. At step 426, for example, when the End User 110 visits a Web page associated with the event or acquisition, the Advertiser Site 106 serves the Web page to the Web browser of the End User 110. In an exemplary embodiment, the Web page can include software code, an applet, a plug-in, and the like, to cause the Web browser of the End User 110 to make a request of the Advertisement Server 126 of the Production Site 104, passing along information that includes the unique identifier of the End User 110 on the Advertiser Site 106, the most recent unique click-through identifier for the Production Site 104 that took the End User 110 to the Advertiser Site 106, and the like. At step 426, the Advertisement Server 126 can log the conversion or acquisition that took place, and can deduct the CPA amount for the involved advertisement campaign from the account of the Advertiser 102. In a further exemplary embodiment, if the Advertiser 102 is to be invoiced, the Advertisement Server 126 can log the fact that such advertiser needs to billed the applicable amount.

Thus, the exemplary performance-based online advertising system embodiments, advantageously, can provide (i) dynamic ranking, prioritizing, and serving of an advertisement for an advertiser paying on a CPA basis based on conversion information, (ii) tracking of a user between a visit or visits to a Web site through clicking on an advertisement, (iii) tracking of the time of actual conversion or acquisition, including a deferred conversion, (iv) tracking of standard conversions that occur during a session in which a user clicks on a relevant advertisement, (v) entering, ranking, displaying, and tracking of a response to an advertisement for which payment is made by an advertiser on a CPA basis, (vi) saving of campaign management time of an advertiser and reducing a delta between a target CPA of the advertiser and an amount paid for an advertisement, (vii) distributing CPA-based advertisements to Internet-based advertising distribution networks, including at least one of Cost-Per-1,000 (CPM) advertising distribution networks, CPC advertising distribution networks, and CPA advertising distribution networks, (viii) delivering of CPA-based advertisements in a variety of formats, including at least one of a CPC-equivalent format, a CPM-equivalent format, and a CPA format, and (ix) tracking of end user conversions and end user acquisitions associated with an advertisement through a verifiable means, including tracking of the end user, direct tracking of conversion information on a site of an advertiser, and tracking of an advertiser passing conversion information back to an advertising server.

The present invention includes recognition that CPC-based advertising has become the prevailing pricing model for online advertising because it has resonated with advertisers as easier, more measurable and more equitable than CPM-based pricing. Nevertheless, as the pay-per-click market becomes more mature, advertisers have realized that not all clicks are created equal. Advertisers measure success in terms of return-on-ad-spend (ROAS) or Cost-Per-Acquisition (CPA) rather than the number of Web site visitors they receive, and are beginning to place demands on the marketplace to account for these metrics.

For an advertiser, managing to an ROAS is an overly complex exercise due to the sophistication needed to truly optimize ad campaigns across multiple networks. The growth in bid management, including outsourcing the administration of pay-per-click campaigns, is one result of this complexity.

Some bid management companies have priced their services to advertisers with a CPA component. For example, a bid management company may simply pass along the CPC charges from a paid listing search engine and base its service fees to advertisers on a percentage of the sales registered through the advertising campaign. However, this is not a true CPA-based pricing model because the advertiser still pays for each click generated. Bid management also fails to account for the perceived risk that an advertising campaign may not convert at all, and therefore advertisers limit their spending to reduce that perceived risk.

Accordingly, in a further exemplary embodiment, an internal sign-up process and listings management system can be provided. In a further exemplary embodiment, an external or automated sign-up process, listings management and reporting, accepting of credit cards, and placing of advertisements on additional advertising networks (e.g., the Overture network) can be provided. Still further exemplary embodiments can support additional advertising networks or online networks and provide a more sophisticated advertising placement formula.

The following exemplary embodiments cover the navigation, access rules and design for an exemplary User Interface tool. For example, the User Interface can be simple (e.g., can be based on text or graphics) and can be configured to provide (1) signing-up of advertisers; (2) advertiser information, including viewing advertisers, an all campaigns page, a campaign page, an advertisement group (Ad group) page, and billing history and administration; (3) advertiser searching; (4) reports, including targeted conversion rate by keyword, targeted conversion rate by advertisement traffic source, revenue by advertiser, revenue by day, and revenue by hour; and (5) administrative tools, including super user, and targeted conversion rate tools.

In an exemplary embodiment, an advertising group (Ad group) can have a specific conversion (or acquisition) action and cost for that acquisition associated with it (e.g., the CPA can be tied to the Ad group). An advertising group can have multiple keywords, each with its own creative, wherein a creative can be a title, display URL, clickthrough URL, description, and the like. For example, one campaign can be Microsoft Office with two Ad groups: Microsoft Excel and Microsoft Word. The Microsoft Word Ad group might have a CPA of $5.00, and the keywords associated with this Ad group might be "word processor," "microsoft office," and "microsoft word." Each of those keywords may have its own unique title, description, clickthrough URL destination URL, and the like. In a further exemplary embodiment, one advertiser can have multiple accounts with multiple campaigns, and the like, associated with the advertiser.

In an exemplary embodiment, the ALL CAMPAIGNS page can have a list of all campaigns for a single advertiser. The page also can have high-level statistics for each campaign and the ability to view, modify, pause or delete that campaign. The page also can allow a user to create a new campaign.

In an exemplary embodiment, the CAMPAIGN page can display information on a single advertising campaign. The page also can have high-level statistics for the advertising campaign and the ability to view, modify the settings, pause or delete the campaign.

In an exemplary embodiment, the AD GROUP page can display information on all keywords for a single Ad group. The page also can have high-level statistics for the keywords and the ability to view, modify the settings, pause or delete the Ad group. In an exemplary embodiment, the CREATIVES page is accessed from the ad group page, and allows a user to edit a creative.

In an exemplary embodiment, the system can display the billing history of an account and allow an administrator to record payments on that account and set a credit limit for that account. In an exemplary embodiment, advertisers have access to a series of reports available on web pages that display conversions, revenue generated from the advertising campaign, ROI (e.g., (revenue−cost)/cost), and the like.

In an exemplary embodiment, the system can use a cookie-based tracking system and can include all features included in the tracking system, including (1) a cookie that can be dropped on a user's browser before redirecting to the user's destination; and (2) a pixel image on the destination site's acquisition page that can register a conversion for the system. In a further exemplary embodiment, the system also can be configured to utilize a back channel, and the like, for the advertiser to share information and to maintain security of purchasing and other information for the advertiser.

In an exemplary embodiment, conversion tracking can support order size (or CPA amount), volume (e.g., number of products sold), and the like. One cookie can be used to register multiple conversions over time. For example, assuming that an office supply store has agreed to pay $25 for the sale of a printer, $5 for the sale of one ream of paper, and $10 for each ink cartridge sold. Then, assuming a user purchases one printer, one ink cartridge, and three reams of paper, in either one session or within a predetermined conversion time period, this would count as five conversions totaling $50.

In an exemplary embodiment, each conversion can be identified by country according to the IP address of the click. The system conversions can be treated and reported separately from the listing engine conversions. Partners can use the system Conversion Tracking Tool or the listing engine tool. In situations where a partner advertiser will not allow the system to track conversions, instead opting to use its own tracking tool, (a) an interface can be employed for sales to enter conversion data by keyword, time-of-day, etc., as they receive data from partners or (b) an API can be employed for partners to post the conversion data automatically to the system.

In an exemplary embodiment, the cookie can record conversions that occur up to a predetermined number of days (e.g., 90 days) from when the original click took place for a unique user. If any conversion takes place, the cookie can be reset for the unique user to the predetermined number of days. This can happen multiple times. For each advertiser, the system can track the conversion rate per listing engine search partner ID or by tracking conversion rate of affiliates or domains of partners of the listing engines.

In an exemplary embodiment, the system can adjust in real time or near real time which search partners receive system paid listings and at what price, based on a targeted conversion rate. This adjustment can be automatic and apply to all listings. This information also can be tracked and available for reporting by day (e.g., conversion rate per partner per day). The targeted conversion rate can be adjustable per partner or per advertiser.

In an exemplary embodiment, for a given advertiser, the system can balance higher converting search partners with lower converting search partners to maximize advertiser budgets within the confines of a targeted conversion rate. For example, assuming the target conversion rate is 1%, if an advertiser is converting at 1.5%, then the system can activate lower converting search partners to maximize the number of conversions within the overall budget constraints of that advertiser.

In an exemplary embodiment, the system can be configured to employ a different CPC per traffic source partner. The system can have a different set of traffic rules for system listings than for regular paid listings within the traffic source. The system can narrow the set of traffic sources that system advertisements are distributed on (e.g., on a system-wide level). For each advertiser, the system can track the conversion rate per keyword. For each advertiser and each keyword, a conversion rate can be tracked for each CPC.

In an exemplary embodiment, partner rank can be defined as the order (e.g., 1st, 2nd) of a system advertisement displayed on a traffic source. For example, a traffic source that is a search engine may pull listings from multiple PPC engines, and order them based on CPC. The top listing would be considered 1st. For each advertiser and each listing, a click-through rate and conversion rate can be tracked for each partner rank.

In an exemplary embodiment, for a given advertiser, the system can balance higher converting search partners with lower converting search partners to maximize advertiser budgets within the confines of a targeted conversion rate. Accordingly, for a given advertiser, the system can balance higher converting keywords with lower converting keywords to maximize spend. For example, assuming the target conversion rate is 1%, if an advertiser is converting at 1.5%, then the system can activate lower converting search partners to maximize the number of conversions within the overall budget constraints of that advertiser. In a further exemplary embodiment, the system can determine whether a keyword is "overbought" or "underbought" according to related keywords, and can funnel money towards keywords where the CPC is relatively "cheap" and funnel money away from keywords where the CPC is relatively "expensive." For example, the placement of system advertisements can be determined based upon the expected number of conversions at the CPA divided by the number of clicks at the CPC. When that ratio is above the targeted conversion rate expectations of the system, the acceptable CPC goes up for the corresponding advertisement. When that ratio is below the targeted conversion rate expectations of the system, the acceptable CPC goes down or the corresponding advertisement is dropped.

In an exemplary embodiment, any suitable algorithm for adjusting CPC based on the conversion rate can be employed. Once the conversion rate is found, the lowest CPC that will be at or above the targeted conversion rate expectations can be chosen. The conversion rate can be automatically recalculated and the CPC can be readjusted based on such calculations.

As previously described, the exemplary performance-based online advertising system 100 of FIG. 1 includes the Production Site 104 having the Advertisement Server User Interface 122, the Advertisement Database 124, and the Advertisement Server 126, with a communications link between the Advertisement Database 124 and the Advertisement server 126. Accordingly, the exemplary performance-based online advertising system 100 of FIG. 1 represent a complete and integrated system for serving advertisements and charging by CPA or by any other suitable means of determining a charge for advertisements.

Figure 5:
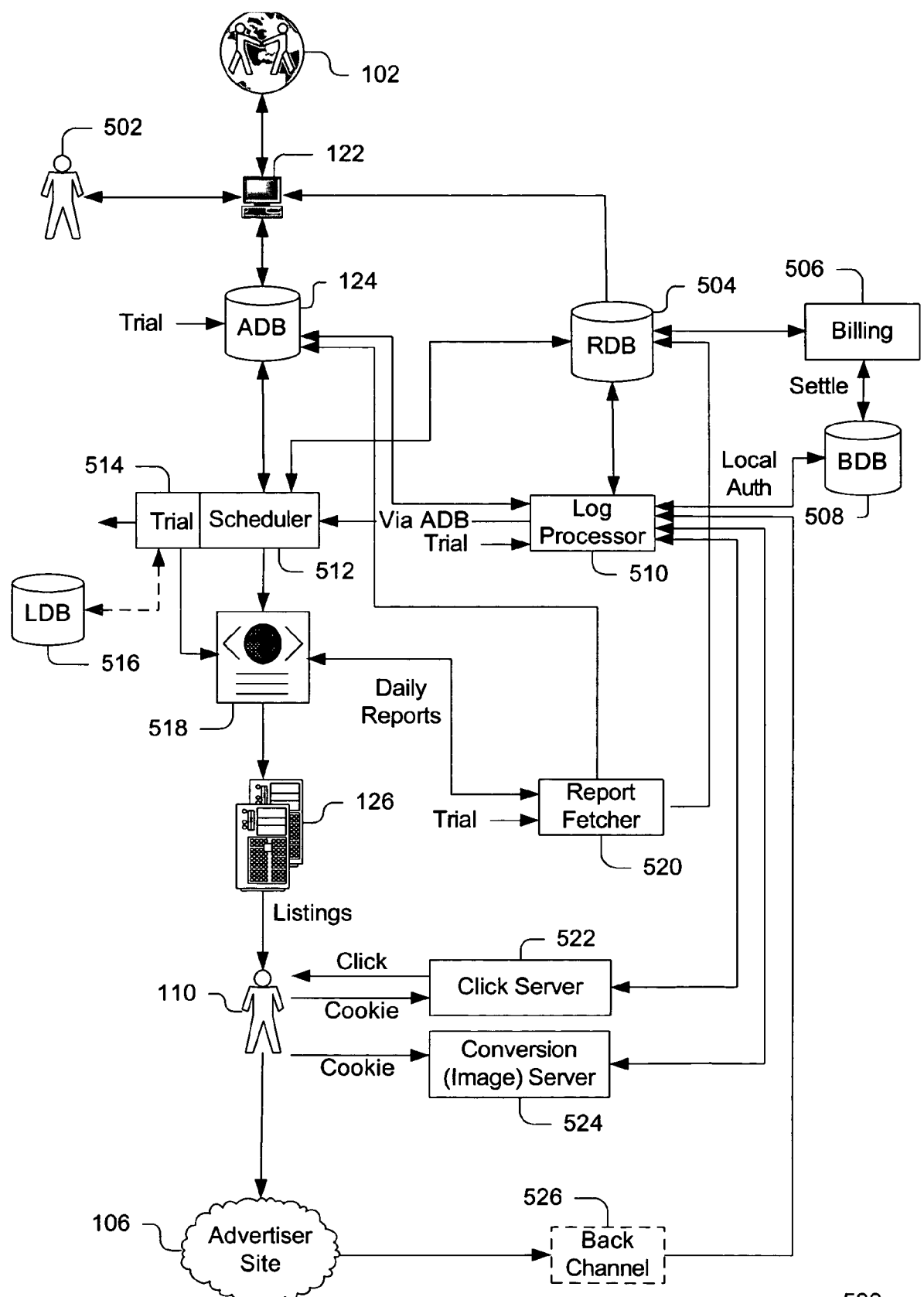
FIG. 5 illustrates a performance-based online advertising system, according to another exemplary embodiment.

FIG. 5 illustrates a performance-based online advertising system 500, according to another exemplary embodiment. In FIG. 5, the exemplary performance-based online advertising system 500 generally maintains an advertisement database and uses the information in the advertisement database to make decisions about when to insert, update, remove, and the like, advertisements in CPC-based and other traffic sources. The exemplary performance-based online advertising system 500 charges by CPA, and attempts to adjust the CPC or other pricing variable of the advertisements on the traffic sources based upon targeted conversion rates. Accordingly, in the exemplary performance-based online advertising system 500, the system can interact with an advertisement server. Such an advertisement server can be part of the Production Site 104, an external listing engine or some third party; and such advertisement server can include an API, database, and the like.

The exemplary performance-based online advertising system 500 employs an architecture where the advertisement server need not talk directly to the advertisement database, but rather employs intermediary programs, such as a scheduler that reads information from the advertisement database, digests the information, and updates the information on the advertisement server used to select and serve the advertisements, and a log processor that reads information from the advertisement server and writes the information to the advertisement database. Advantageously, such an architecture decouples the advertisement server from the advertisement database so that advertisements can be served even if the advertisement database is down. This also moves expensive computations off the advertisement server and into the scheduler and log processor machines to reduce overhead in the advertisement server, reduce stress on the advertisement database, and increase scalability. Additional components to the dataflow can be employed, such as a queue where advertisements wait for approval, and the like.

Accordingly, in FIG. 5, a User Interface/API layer 122 is accessible via the Internet to authenticated users, including both external Advertisers 102 and internal Administrators 502. Accessibility to pages and features of the User Interface 122 can be determined by the type of user. The User Interface 122 can be used to add new data to the Advertisement Database 124 or display and edit existing data from the Advertisement Database 124. The User Interface 122 also can be used to display information from a Reporting Database 504.

An API layer 518 can be provided as a representation of a means for system components to talk to one or more Listing Engines 126 and can be used to present a uniform interface across the Listing Engines 126 for a Scheduler 512 and Report Fetcher 520. In an exemplary embodiment, the API layer 122 can include the Report Fetcher 520 module for fetching reports from the Listing Engines 126, and a module for pushing listing changes in the Advertisement Database 124 to the listing engines 126.

In an exemplary embodiment, the Report Fetcher 520 can be configured to run infrequently, for example, pulling summarized reports from the Listing Engines 126 once per day, once per week, and the like. The report data can be rolled up as needed and inserted into the Reporting Database 504. In an exemplary embodiment, the Listing Engines 126 can be periodically queried to obtain accurate click counts, costs, and the like. Although clicks could be counted and click costs could be tallied internally, such numbers may not be accurate since it would not be known whether a listing engine considered any given click to be fraudulent, and it would not be known with certainty the CPC for any given click due to data propagation delays, and the like.

In an exemplary embodiment, the push portion, for example, can be run as a separate process, and the like, and can receive update information from the Scheduler 512 and the Advertisement Database 124. The Advertisement Database 124 can be configured to store data that defines the listings and to communicate update data to the API push layer

122. In a further exemplary embodiment, updates can go from the Scheduler 512 through the API layer 518 to the Listing Engines 126.

The Reporting Database 504 can be on the same physical database as or a separate database from the Advertisement Database 124. A Listing Engine Database 516 can be configured to store information for the Listing Engine 126. Some of the data employed for reporting (e.g., advertisement traffic source, etc.) can be made easily available from the Listing Engine Database 516, and may otherwise be difficult to obtain. In an exemplary embodiment, the Listing Engines 126 can be configured to store information for the Scheduler 512, the Report Fetcher 520, the Log Processor, and the like.

In an exemplary embodiment, the Scheduler 512 can be configured to be responsible for scheduling insertion, modification, and removal of listings on the Listing Engines 126 (e.g., via the API layer 518) as data is inserted and modified via the User Interface 122 or when the Scheduler 512 determines that a listing change is needed. The Scheduler 512 can be further configured to be responsible for periodically revising the CPC of listings based on click, conversion information, and the like. Such a period can be flexible and can be based on time intervals, click counts, conversion counts, combinations thereof, and the like. The CPC can be determined with any suitable number of granularities, including on a global basis, on per listing engine basis, on a per advertisement traffic source basis, on a per day of week basis, on a per hour basis, on a per geographical region basis, and the like. The Scheduler 512 can be further configured to be responsible for dropping underperforming listings based on some predetermined criteria, and the like, wherein the listings can be reinstated as more click data, conversion data, and the like, becomes available.

In an exemplary embodiment, a Trial component 514 can be included as a specialized component of the Scheduler 512, and can be responsible for determining acquisition rates for added listings, and the like. The Trial component 514, for example, can send listings to a CPC-based listing company (e.g., Enhance Interactive, Overture, GoClick, Google, etc.) at a fixed CPC. The listing then can be run for a predetermined length of time, and the conversion rate seen during such a period can be used to calculate the initial CPC for all of the Listing Engines 126. In an exemplary embodiment, the Trial component 514 can use the Listing Engine Database 516 to acquire specialized information, such as traffic quality measurements, and the like, for conversion rate tracking.

In an exemplary embodiment, a Click Server 522 can be configured to handle clicks made by an End User 110 clicking on listing results. The Click Server 522 can extract and log the listing ID and other information, which can be encrypted and placed in a Uniform Resource Locator (URL), can give a browser of the End User 110 a cookie that can be used to identify the click for matching with subsequent conversions, and can redirect to the URL of the listing (e.g., an Advertiser Site 106). Accordingly, when the End User 110 clicks on a listing result, the Click Server 522 passes the corresponding click information to the Log Processor 510.

In an exemplary embodiment, a Conversion/Pixel Server 524 can be configured to handle conversion-related requests that allow tracking of conversions, and the like. In an exemplary embodiment, the Advertiser 102 can include a conversion completion page at the Advertiser Site 106 that can include a mechanism in the HTML to cause the browser of the End User 110 to make a request for a tracking pixel, and the like, to the Conversion Server 524. The Conversion Server 524 then can take the cookie set by the Click Server 522 and extract information from the request URL, which identifies the listing, and log such information to the Log Processor 510. In an exemplary embodiment, a conversion can match zero or more clicks, and a click can match zero or more conversions, depending on the tracking format employed.

In an exemplary embodiment, a Back Channel 526 can be configured as an alternative to the Conversion Server 524 for tracking conversions. For example, instead of tracking conversions via a browser request, the Advertiser Site 106 through the Back Channel 526 (e.g., over HTTP, etc.) can contact the Log Processor 510 and send the corresponding information for logging and identifying the end user 110.

In an exemplary embodiment, the Log Processor 510 can be configured to periodically contact the Click Server 522, the Conversion Server 524, and the Back Channel 526 to retrieve the corresponding click and conversion logs, and write such data to the Reporting Database 504. The Log Processor 510 also can be configured to queue listings for the Scheduler 512 to check on after a predetermined number of clicks or conversions have been logged, handle accounting and budget caps, and the like. Advantageously, the Log Processor 510 decouples the Click Server 522, the Conversion Server 524, and the Back Channel 526 from the Reporting Database 504 and the Advertisement Database 124. The Log Processor 510 also provides security since the Click Server 522 and the Conversion Server 524 need not employ database passwords, provides fault tolerance by allowing the Click Server 522 and the Conversion Server 524 to operate while the Reporting Database 504 and/or the Advertisement Database 124 are down, and provides efficiency by consolidating data into large transactions.

In an exemplary embodiment, a Billing component 506 can be configured as a separate process that handles settling account charges with a Billing Database 508, based on data in the Reporting Database 504. The Billing component 506 can be configured to run on a daily basis, weekly basis, and the like. The Billing component 506 also can be configured to include code that can be used by the Log Processor 510 to perform local authorizations, and the like, as needed.

In an exemplary embodiment, the End User 110 is a person, entity, system, program, and the like, interacting with the exemplary system 500 (e.g., via a browser, API, etc.). The sequence of events triggered by the End User 110 include the End User 110 performing a search that returns data from one or more listings placed with one or more of the Listing Engines 126. When the End User 110 clicks on a listing placed by the exemplary performance-based online advertising system 500, the browser of the End User 110 fetches a URL from the Click Server 522, and the Click Server logs the click and redirects to the browser of the End User 110, after zero or more redirects, to the URL of the listing (e.g., the Advertiser Site 106).

At some later time, the End User 110 completes a conversion. The conversion completion page can include some code, tag, and the like, to cause the browser of the End User 110 to make a request, for example, for a tracking pixel, and the like, to the Conversion Server 524. The Conversion Server 524 then checks the request for the cookie set by the Click Server 522, and extracts information from the request URL, which identifies the Advertiser 102, the listing, and the like, and logs such information to the Log Processor 510. In an exemplary embodiment, the conversion can be matched to a previous click either by the Conversion Server 524 or by subsequent processing. A conversion can match zero or one click, and a click can match zero, one or more conversions.

In the exemplary performance-based online advertising system embodiments, in many cases, components are drawn as single machines, modules, or components, but in practice can be run on several single machines, modules, or components at once. For scalability, reliability, and redundancy, any one of the logical components of the exemplary performance-based online advertising system embodiments can be implemented by one or more physical components, e.g., multiple scheduler and log processor machines running either in parallel or in reserve as hot or cold backups, as will be appreciated by those skilled in the relevant art(s).

In an exemplary embodiment, the system can be configured to pick keywords for the advertiser. For example, an advertiser can purchase an advertisement, including a click-url, title, description, etc., but without a need to associate any keyword to the advertisement. The system then can automatically select relevant keyword(s) for the advertisement, for example, based on performance metrics seen in the past, such as query rates, clickthrough rates, conversion rates, and the like, and perform advertising based on the selected keyword(s). In a further exemplary embodiment, the system can perform translation (e.g., AccuMatch, etc.) on the keyword(s) picked by the advertiser, and place listings based on additional keywords determined based on the translation.

In an exemplary embodiment, the system can be configured to automatically perform listing in Paid Inclusion (PI) engines, for example, after determining conversion rates, as Paid Inclusion (PI) engines tend to be flat rated. Advantageously, such an exemplary system can generate a relatively good ROI, assuming accurately determined expected clickthrough rates.

In an exemplary embodiment, the system can be configured as a marketing solution, wherein an advertiser can pick site(s) to advertise or a list of URLs, and the system can go behind the scenes and automatically set up a whole package of listings (e.g., for PPC and PI listing engines), including choosing keyword(s), advertisement topic(s), and the like, based on content, editorial review, and the like.

The exemplary embodiments, advantageously, can include an internal sign-up process and listings management, simple conversion tracking by keyword, Enhance Interactive network support, simple targeting (CPC, keyword), external sign-up process and listings management, Showbox showcase site, Overture network support, agency API, keyword suggestion support, advanced budgeting tools, Google network support, keyword matching rules, advanced tracking (daypart, days of week, local), targeted conversion rate targeting, advanced targeting (daypart, days of week, local), professional services tracking, conversion rate tracking on third party API, extended networks support (FWHT, LOOK), professional services targeting, account management (internal), budgeting (internal), conversion rate by CPC (targeting), conversion rate by CPC (tracking), conversion rate by keyword (targeting), conversion rate by keyword (tracking), conversion rate by advertisement traffic source (targeting), conversion rate by advertisement traffic source (tracking), conversion tracking (single product support), conversion tracking BrochureWare, CTR (tracking), CTR by CPC (targeting), CTR by CPC (tracking), customer reports (external), listings manager (internal), management reports (internal), rank (tracking), credit card/billing processing, account management (external), automatic deposit calculator, automatic e-mail system, budgeting (external), conversion tracking (multi-product/multi-customer, conversion tracking (type support), conversion tracking wizard (external), external Brochureware, gambling/adult flagging, geotargeting (tracking), keyword suggestion tool, conversion rate by rank (tracking), CTR by rank (tracking), dayparting (tracking), days of the week (tracking), geotargeting (targeting), keyword matching and filtering support, local target (tracking), targeted conversion rate targeting, ad copy type analysis, automatic price setting by industry, automatic price setting by keyword, banner advertising support, conversion rate by rank (targeting), conversion tracking (third party API), conversion tracking (type targeting), CTR by rank (targeting), dayparting (targeting), days of the week (targeting), geotargeting wizard (external), landing page type analysis, local target (targeting), targeted conversion rate targeting (advanced), ad copy type analysis and targeting, contextual ad placement, local wizard (external), and the like.

The above-described devices and subsystems of the exemplary performance-based online advertising system embodiments can include, for example, any suitable servers, workstations, Personal Computers (PCs), laptop computers, Personal Digital Assistants (PDAs), Internet appliances, handheld devices, television browsers, cellular telephones, wireless devices, other devices, etc., capable of performing the processes of the exemplary embodiments. The devices and subsystems can communicate with each other using any suitable protocol and can be implemented using the computer system 600 of FIG. 6, for example.

One or more interface mechanisms can be used in the exemplary performance-based online advertising system embodiments, for example, including Internet access, telecommunications in any form (e.g., voice, modem, etc.), wireless communications media, etc. Accordingly, the communications networks employed in the exemplary performance-based online advertising system embodiments, for example, can include one or more wired or wireless communications networks, cellular communications networks, G3 communications networks, Public Switched Telephone Network (PSTNs), Packet Data Networks (PDNs), the Internet, intranets, any suitable combination thereof, and the like.

It is to be understood that the performance-based online advertising system embodiments are for exemplary purposes, as many variations of the specific hardware and/or software used to implement the exemplary embodiments are possible, as can be appreciated by those skilled in the relevant art(s). For example, the functionality of the devices and the subsystems of the exemplary performance-based online advertising system embodiments can be implemented via one or more programmed computer systems or devices.

To implement such variations as well as other variations, a single computer system (e.g., the computer system 600 of FIG. 6) can be programmed to perform the special purpose functions of one or more of the devices and subsystems of the exemplary performance-based online advertising system embodiments. On the other hand, two or more programmed computer systems or devices can be substituted for any one of the devices and subsystems of the exemplary performance-based online advertising system embodiments. Accordingly, principles and advantages of distributed processing, such as redundancy, replication, etc., also can be implemented, as desired, for example, to increase the robustness and performance of the exemplary performance-based online advertising system embodiments.

The exemplary performance-based online advertising system embodiments can store information relating to various exemplary processes described herein. This information can be stored in one or more memories, such as a hard disk, an optical disk, a magneto-optical disk, a RAM, etc., of the devices of the exemplary performance-based online advertising system embodiments. One or more databases of the devices and subsystems of the exemplary performance-based online advertising system embodiments can store the information used to implement the exemplary embodiments of the present invention. The databases can be organized using data structures (e.g., records, tables, arrays, fields, graphs, trees, and/or lists) included in one or more memories, such as the memories listed above or any of the storage devices listed below in the discussion of FIG. 6, for example.

The previously described processes can include appropriate data structures for storing data collected and/or generated by the processes of the exemplary performance-based online advertising system embodiments in one or more databases thereof. Such data structures accordingly can include fields for storing such collected and/or generated data. In a database management system, data can be stored in one or more data containers, each container including records, and the data within each record can be organized into one or more fields. In relational database systems, the data containers can be referred to as tables, the records can be referred to as rows, and the fields can be referred to as columns. In object-oriented databases, the data containers can be referred to as object classes, the records can be referred to as objects, and the fields can be referred to as attributes. Other database architectures can be employed and use other terminology. Systems that implement the embodiments of the present invention are not limited to any particular type of data container or database architecture.

All or a portion of the exemplary performance-based online advertising system embodiments can be conveniently implemented using one or more conventional general purpose computer systems, microprocessors, digital signal processors, micro-controllers, etc., programmed according to the teachings of the present invention (e.g., using the computer system of FIG. 6), as can be appreciated by those skilled in the computer and software art(s). Appropriate software can be readily prepared by programmers of ordinary skill based on the teachings of the present invention, as can be appreciated by those skilled in the software art(s). Further, the exemplary performance-based online advertising system embodiments can be implemented on the World Wide Web (e.g., using the computer system of FIG. 6). In addition, the exemplary performance-based online advertising system embodiments can be implemented by the preparation of application-specific integrated circuits or by interconnecting an appropriate network of conventional component circuits, as can be appreciated by those skilled in the electrical art(s).

Figure 6:
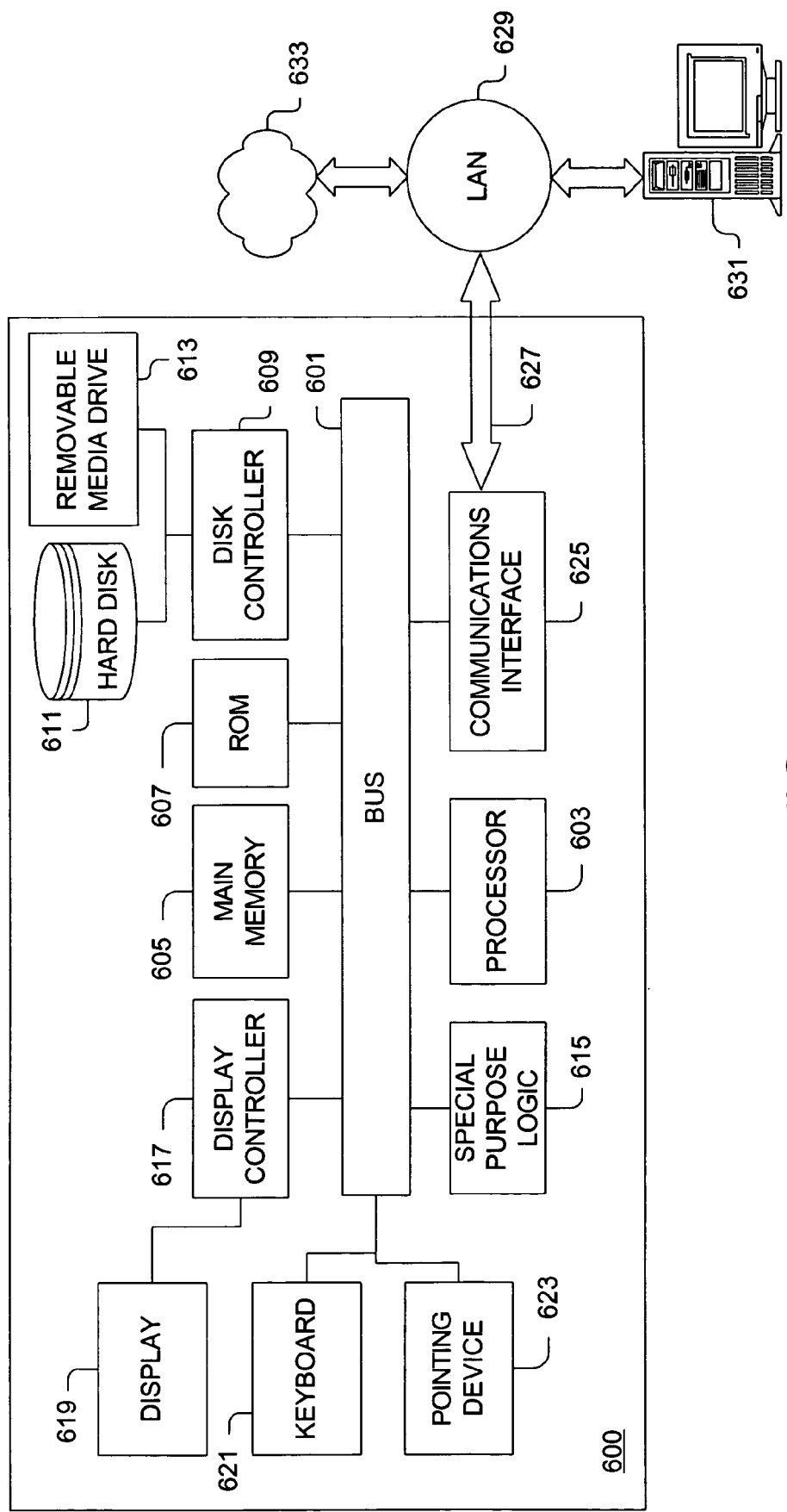
FIG. 6 is an exemplary computer system, which may be programmed to perform one or more of the processes of the described exemplary embodiments.

FIG. 6 illustrates a computer system 600 upon which the exemplary performance-based online advertising system embodiments can be implemented. The exemplary embodiments can be implemented on one or more of such computer systems. The computer system 600 can include a bus 601 or other communication mechanism for communicating information, and a processor 603 coupled to the bus 601 for processing the information. The computer system 600 also can include a main memory 605, such as a random access memory (RAM), other dynamic storage device (e.g., dynamic RAM (DRAM), static RAM (SRAM), synchronous DRAM (SDRAM)), etc., coupled to the bus 601 for storing information and instructions to be executed by the processor 603.

In addition, the main memory 605 also can be used for storing temporary variables or other intermediate information during the execution of instructions by the processor 603. The computer system 600 further can include a ROM 607 or other static storage device (e.g., programmable ROM (PROM), erasable PROM (EPROM), electrically erasable PROM (EEPROM), etc.) coupled to the bus 601 for storing static information and instructions.

The computer system 600 also can include a disk controller 609 coupled to the bus 601 to control one or more storage devices for storing information and instructions, such as a magnetic hard disk 611, and a removable media drive 613 (e.g., floppy disk drive, read-only compact disc drive, read/write compact disc drive, compact disc jukebox, tape drive, and removable magneto-optical drive). The storage devices can be added to the computer system 600 using an appropriate device interface (e.g., small computer system interface (SCSI), integrated device electronics (IDE), enhanced-IDE (E-IDE), direct memory access (DMA), or ultra-DMA).

The computer system 600 also can include special purpose logic devices 615, such as application specific integrated circuits (ASICs), full custom chips, configurable logic devices (e.g., simple programmable logic devices (SPLDs), complex programmable logic devices (CPLDs), field programmable gate arrays (FPGAs), etc.), and the like, for performing special processing functions, such as signal processing, image processing, speech processing, voice recognition, communications functions, advertisement generating and serving functions, etc.

The computer system 600 also can include a display controller 617 coupled to the bus 601 to control a display 619, such as a cathode ray tube (CRT), television display, liquid crystal display (LCD), active matrix display, plasma display, touch display, etc., for displaying or conveying information to a computer user. The computer system can include input devices, such as a keyboard 621 including alphanumeric and other keys and a pointing device 623, for interacting with a computer user and providing information to the processor 603. The pointing device 623 can include, for example, a mouse, a trackball, a pointing stick, etc., or voice recognition processor, etc., for communicating direction information and command selections to the processor 603 and for controlling cursor movement on the display 619. In addition, a printer can provide printed listings of the data structures/information of the exemplary performance-based online advertising system 100 shown in FIG. 1 or any other data stored and/or generated by the computer system 600.

The computer system 600 can perform a portion or all of the processing steps of the invention in response to the processor 603 executing one or more sequences of one or more instructions contained in a memory, such as the main memory 605. Such instructions can be read into the main memory 605 from another computer readable medium, such as the hard disk 611 or the removable media drive 613. Execution of the arrangement of instructions contained in the main memory 605 causes the processor 603 to perform the process steps described herein. One or more processors in a multi-processing arrangement also can be employed to execute the sequences of instructions contained in the main memory 605. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 600, for driving a device or devices for implementing the invention, and for enabling the computer system 600 to interact with a human user (e.g., users of the exemplary performance-based online advertising system 100, etc.). Such software can include, but is not limited to, device drivers, firmware, operating systems, development tools, applications software, etc. Such computer readable media further can include a computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

The computer system 600 also can include a communication interface 625 coupled to the bus 601. The communication interface 625 can provide a two-way data communication coupling to a network link 627 that is connected to, for example, a local area network (LAN) 629, or to another communications network 633 (e.g. a wide area network (WAN), a global packet data communication network, such as the Internet, etc.). For example, the communication interface 625 can include a digital subscriber line (DSL) card or modem, an integrated services digital network (ISDN) card, a cable modem, a telephone modem, etc., to provide a data communication connection to a corresponding type of telephone line. As another example, the communication interface 625 can include a local area network (LAN) card (e.g., for Ethernet™, an Asynchronous Transfer Model (ATM) network, etc.), and the like, to provide a data communication connection to a compatible LAN. Wireless links also can be implemented. In any such implementation, the communication interface 625 can send and receive electrical, electromagnetic, or optical signals that carry digital data streams representing various types of information. Further, the communication interface 625 can include peripheral interface devices, such as a Universal Serial Bus (USB) interface, a PCMCIA (Personal Computer Memory Card International Association) interface, etc.

The network link 627 typically can provide data communication through one or more networks to other data devices. For example, the network link 627 can provide a connection through the LAN 629 to a host computer 631, which has connectivity to the network 633 or to data equipment operated by a service provider. The LAN 629 and the network 633 both can employ electrical, electromagnetic, or optical signals to convey information and instructions. The signals through the various networks and the signals on the network link 627 and through the communication interface 625, which communicate digital data with computer system 600, are exemplary forms of carrier waves bearing the information and instructions.

The computer system 600 can send messages and receive data, including program code, through the network 629 and/or 633, the network link 627, and the communication interface 625. In the Internet example, a server can transmit requested code belonging to an application program for implementing an embodiment of the present invention through the network 633, the LAN 629 and the communication interface 625. The processor 603 can execute the transmitted code while being received and/or store the code in the storage devices 611 or 613, or other non-volatile storage for later execution. In this manner, computer system 600 can obtain application code in the form of a carrier wave. With the system of FIG. 6, the embodiments of the present invention can be implemented on the Internet as a Web Server 600 performing one or more of the processes according to the embodiments of the present invention for one or more computers coupled to the Web server 600 through the network 633 coupled to the network link 627.

The term computer readable medium as used herein can refer to any medium that participates in providing instructions to the processor 603 for execution. Such a medium can take many forms, including but not limited to, non-volatile media, volatile media, transmission media, etc. Non-volatile media can include, for example, optical or magnetic disks, magneto-optical disks, etc., such as the hard disk 611 or the removable media drive 613. Volatile media can include dynamic memory, etc., such as the main memory 605. Transmission media can include coaxial cables, copper wire and fiber optics, including the wires that make up the bus 601. Transmission media also can take the form of acoustic, optical, or electromagnetic waves, such as those generated during radio frequency (RF) and infrared (IR) data communications.

As stated above, the computer system 600 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to either of the networks 629 and 633. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

Although the exemplary embodiments are described in terms of online advertising, the present invention is applicable to other forms of advertising, for example, including print advertising, radio advertising, TV advertising, direct mail advertising, and the like, as can be appreciated by those skilled in the relevant art(s).

While the present invention has been described in connection with a number of exemplary embodiments and implementations, the present invention is not so limited but rather covers various modifications and equivalent arrangements, which fall within the purview of the appended claims.

What is claimed is:

1. A computer-implemented method for providing cost-per-acquisition (CPA)-based online advertising, comprising:

receiving a set CPA pricing for a designated action, the set CPA pricing including a targeted conversion rate, and the targeted conversion rate including a ratio of an expected number of conversions to a number of clicks of an on-line advertisement;

computing and dynamically updating a cost-per-click (CPC) value of the advertisement for an advertisement traffic source based on at least one of a price variable, an advertisement traffic source variable, and an advertiser variable;

dynamically determining a ranking of the advertisement based upon the updated cost-per-click (CPC) value and the set CPA pricing;

automatically uploading and distributing the advertisement to the advertisement traffic source based on the dynamic ranking; and determining an advertising placement within the advertisement traffic source based upon the dynamic ranking, the at least one price variable, advertisement traffic source variable, and advertiser variable, and the designated action;

dynamically determining a conversion rate of the dynamically updated cost-per-click (CPC) and the designated action;

dynamically updating the cost-per-click (CPC) value of the advertisement for the advertisement traffic source based on a ratio of an expected number of conversions to a number of clicks; and dynamically raising the cost-per-click (CPC) value of the advertisement when the ratio is above a targeted conversion rate and dynamically lowering the cost-per-click (CPC) value of the advertisement when the ratio is below the targeted conversion rate.

2. The method of claim 1, wherein the price variable includes at least one of a cost-per-acquisition (CPA) an advertiser is willing to pay for the advertisement and a targeted conversion rate based on at least one of a cost-per-1000 (CPM), CPC, and the CPA.

3. The method of claim 1, wherein the advertiser variable includes at least one of a type of product associated with the advertisement, a type of conversion associated with the advertisement, a keyword associated with the advertisement, and a copy type associated with the advertisement.

4. The method of claim 1, wherein the advertisement traffic source variable includes at least one of an advertising distribution network associated with the advertisement traffic source, a conversion rate associated with the advertisement, a clickthrough rate associated with the advertisement, a rank of the advertisement on a web page associated with the advertisement traffic source, and a location of the advertisement on a web page associated with the advertisement traffic source.

5. The method of claim 4, wherein the conversion rate is based on a number of conversions in a predetermined time period divided by a number of clicks in the predetermined time period.

6. The method of claim 1, wherein the advertiser variable includes at least one of a geographical location of a customer searching for the advertisement of the advertiser, a time of day a customer is searching for the advertisement of the advertiser, a day of week a customer is searching for the advertisement of the advertiser, and a previous purchase made by a customer of the advertiser.

7. The method of claim 1, further comprising computing a cost-per-acquisition (CPA) an advertiser is willing to pay for the advertisement based on another advertisement competing with the advertisement.

8. The method of claim 1, further comprising selecting a keyword associated with the advertisement based on at least one of a past performance of the selected keyword, a past performance of a category of keywords associated with the selected keyword, and a product associated with the selected keyword.

9. The method of claim 1, further comprising automatically tracking sales based on the advertisement.

10. A computer-readable medium for providing cost-per-acquisition (CPA)-based online advertising including computer-readable instructions recorded on the computer-readable medium configured to cause one or more computer processors to execute the steps comprising:

receiving a set CPA pricing for a designated action, the set CPA pricing including a targeted conversion rate, and the targeted conversion rate including a ratio of an expected number of conversions to a number of clicks of an on-line advertisement;

computing and dynamically updating a cost-per-click (CPC) value of the advertisement for an advertisement traffic source based on at least one of a price variable, an advertisement traffic source variable, and an advertiser variable;

dynamically determining a ranking of the advertisement based upon the updated cost-per-click (CPC) value and the set CPA pricing;

automatically uploading and distributing the advertisement to the advertisement traffic source based on the dynamic ranking; and determining an advertising placement within the advertisement traffic source based upon the dynamic ranking, the at least one price variable, advertisement traffic source variable, and advertiser variable, and the designated action;

dynamically determining a conversion rate of the dynamically updated cost-per-click (CPC) and the designated action;

dynamically updating the cost-per-click (CPC) value of the advertisement for the advertisement traffic source based on a ratio of an expected number of conversions to a number of clicks; and dynamically raising the cost-per-click (CPC) value of the advertisement when the ratio is above a targeted conversion rate and dynamically lowering the cost-per-click (CPC) value of the advertisement when the ratio is below the targeted conversion rate.

11. A computer-implemented system for providing cost-per-acquisition (CPA)-based online advertising for online advertising, comprising:

means for receiving a set CPA pricing for a designated action, the set CPA pricing including a targeted conversion rate, and the targeted conversion rate including a ratio of an expected number of conversions to a number of clicks of an on-line advertisement;

means for computing and dynamically updating a cost-per-click (CPC) value of the advertisement for an advertisement traffic source based on at least one of a price variable, an advertisement traffic source variable, and an advertiser variable;

means for dynamically determining a ranking of the advertisement based upon the updated cost-per-click (CPC) value and the set CPA pricing;

means for automatically uploading and distributing the advertisement to the advertisement traffic source based on the dynamic ranking;

means for determining an advertising placement within the advertisement traffic source based upon the dynamic ranking, the at least one price variable, advertisement traffic source variable, and advertiser variable, and the designated action;

means for dynamically determining a conversion rate of the dynamically updated cost-per-click (CPC) and the designated action;

means for dynamically updating the cost-per-click (CPC) value of the advertisement for the advertisement traffic source based on a ratio of an expected number of conversions to a number of clicks; and means for dynamically raising the cost-per-click (CPC) value of the advertisement when the ratio is above a targeted conversion rate and dynamically lowering the cost-per-click (CPC) value of the advertisement when the ratio is below the targeted conversion rate.

12. A computer-implemented method for providing cost-per-acquisition-based online advertising, comprising:

receiving a set CPA pricing for a designated action, the set CPA pricing including a targeted conversion rate, and the targeted conversion rate including a ratio of an expected number of conversions to a number of clicks of an on-line advertisement;

computing and dynamically updating at least one of a cost-per-click (CPC) value and a cost-per-1000 (CPM) value of the advertisement for an advertisement traffic source;

dynamically determining a ranking of the advertisement based upon at least one of the updated cost-per-click (CPC) value and the cost-per-1000 (CPM) value and the set CPA pricing;

dynamically updating an advertisement listing that has a cost-per-acquisition (CPA)-based value with at least one of an associated cost-per-click (CPC) value and cost-per-1000 (CPM) value; and automatically distributing the advertisement listing to an advertisement distribution network that serves the advertisement listing based on at least one of the CPC value and the CPM value and based on the dynamic ranking; and determining an advertising placement within the advertisement traffic source based upon the dynamic ranking, the at least one of an associated cost-per-click (CPC) value and cost-per-1000 (CPM) value, and the designated action;

dynamically determining a conversion rate of at least one of the dynamically updated cost-per-click (CPC) and the dynamically updated cost-per100 (CPM) and the designated action;

dynamically updating at least one of the cost-per-click (CPC) value and the cost-per-1000 value of the advertisement for the advertisement traffic source based on a ratio of an expected number of conversions to a number of clicks; and dynamically raising at least one of the cost-per-click (CPC) value and the cost-per-1000 value of the advertisement when the ratio is above a targeted conversion rate and dynamically lowering at least one of the cost-per-click (CPC) value and the cost-per-1000 value of the advertisement when the ratio is below the targeted conversion rate, and wherein the advertisement distribution network includes at least one of a CPC-based advertisement distribution network, a CPA-based advertisement distribution network, and a CPM-based advertisement distribution network.

13. The method of claim 12, wherein the updating step is based on analyzing sample data obtained from serving the advertisement listing for a predetermined period of time.

14. The method of claim 12, further comprising:

automatically inserting the advertisement listing into the advertisement distribution network; and managing the advertisement listing in the advertisement distribution network to approximate a targeted CPA-based value.

15. The method of claim 12, further comprising:

measuring a performance of the advertisement listing based on a variable; and dynamically updating a rank of the advertisement listing in the advertisement distribution network to reflect a performance of the advertisement listing based on the variable.

16. The method of claim 15, wherein the variable includes at least one of a number of clicks associated with the advertisement listing, a number of conversions associated with the advertisement listing, a clickthrough rate associated with the advertisement listing, a conversion rate associated with the advertisement listing, and monetization over time associated with the advertisement listing.

17. The method of claim 12, further comprising:

tracking across multiple user sessions a click on the advertisement listing or a visit of a user to a site of an advertiser associated with the advertisement listing; and determining a subsequent conversion of the advertisement listing by the user based on the click or the visit of the user to the site of the advertiser.

18. The method of claim 12, further comprising outputting the advertisement listing in at least one of a CPC-based ranked order, a CPA-based ranked order, and a CPM-based ranked order.

19. A computer-readable medium for providing cost-per-acquisition-based online advertising including computer-readable instructions recorded on the computer-readable medium configured to cause one or more computer processors to execute the steps comprising:

receiving a set CPA pricing for a designated action, the set CPA pricing including a targeted conversion rate, and the targeted conversion rate including a ratio of an expected number of conversions to a number of clicks of an on-line advertisement;

computing and dynamically updating at least one of a cost-per-click (CPC) value and a cost-per-1000 (CPM) value of the advertisement for an advertisement traffic source;

dynamically determining a ranking of the advertisement based upon at least one of the updated cost-per-click (CPC) value and the cost-per-1000 (CPM) value and the set CPA pricing;

dynamically updating an advertisement listing that has a cost-per-acquisition (CPA)-based value with at least one of an associated cost-per-click (CPC) value and cost-per-1000 (CPM) value; and automatically distributing the advertisement listing to an advertisement distribution network that serves the advertisement listing based on at least one of the CPC value and the CPM value and based on the dynamic ranking; and determining an advertising placement within the advertisement traffic source based upon the dynamic ranking, the at least one of an associated cost-per-click (CPC) value and cost-per-1000 (CPM) value, and the designated action;

dynamically determining a conversion rate of at least one of the dynamically updated cost-per-click (CPC) and the dynamically updated cost-per100 (CPM) and the designated action;

dynamically updating at least one of the cost-per-click (CPC) value and the cost-per-1000 value of the advertisement for the advertisement traffic source based on a ratio of an expected number of conversions to a number of clicks; and dynamically raising at least one of the cost-per-click (CPC) value and the cost-per-1000 value of the advertisement when the ratio is above a targeted conversion rate and dynamically lowering at least one of the cost-per-click (CPC) value and the cost-per-1000 value of the advertisement when the ratio is below the targeted conversion rate, and wherein the advertisement distribution network includes at least one of a CPC-based advertisement distribution network, a CPA-based advertisement distribution network, and a CPM-based advertisement distribution network.

20. A computer-implemented system for providing cost-per-acquisition-based online advertising, comprising:

means for receiving a set CPA pricing for a designated action, the set CPA pricing including a targeted conversion rate, and the targeted conversion rate including a ratio of an expected number of conversions to a number of clicks of an on-line advertisement;

means for computing and dynamically updating at least one of a cost-per-click (CPC) value and a cost-per-1000 (CPM) value of the advertisement for an advertisement traffic source;

means for dynamically determining a ranking of the advertisement based upon at least one of the updated cost-per-click (CPC) value and the cost-per-1000 (CPM) value and the set CPA pricing;

means for dynamically updating an advertisement listing that has a cost-per-acquisition (CPA)-based value with at least one of an associated cost-per-click (CPC) value and cost-per-1000 (CPM) value; and means for automatically distributing the advertisement listing to an advertisement distribution network that serves the advertisement listing based on at least one of the CPC value and the CPM value and based on the dynamic ranking; and means for determining an advertising placement within the advertisement traffic source based upon the dynamic ranking, the at least one of an associated cost-per-click (CPC) value and cost-per-1000 (CPM) value, and the designated action;

means for dynamically determining a conversion rate of at least one of the dynamically updated cost-per-click (CPC) and the dynamically updated cost-per100 (CPM) and the designated action;

means for dynamically updating at least one of the cost-per-click (CPC) value and the cost-per-1000 value of the advertisement for the advertisement traffic source based on a ratio of an expected number of conversions to a number of clicks; and means for dynamically raising at least one of the cost-per-click (CPC) value and the cost-per-1000 value of the advertisement when the ratio is above a targeted conversion rate and dynamically lowering at least one of the cost-per-click (CPC) value and the cost-per-1000 value of the advertisement when the ratio is below the targeted conversion rate, and wherein the advertisement distribution network includes at least one of a CPC-based advertisement distribution network, a CPA-based advertisement distribution network, and a CPM-based advertisement distribution network.

21. A computer-implemented method for providing cost-per-acquisition-based online advertising, the method comprising the steps of:

receiving a set CPA pricing for a designated action, the set CPA pricing including a targeted conversion rate, and the targeted conversion rate including a ratio of an expected number of conversions to a number of clicks of an on-line advertisement;

automatically determining a cost-per-click (CPC) value for a cost-per-acquisition (CPA)-based advertisement;

dynamically determining a ranking of the advertisement based upon the determined cost-per-click (CPC) value and the set CPA pricing;

automatically placing the advertisement on an advertising network at the determined cost-per-click (CPC), based on the dynamic ranking, wherein the placement of the advertisement is determined based on a ratio of an expected number of conversions, associated with the advertisement, at a cost-per-acquisition (CPA) value, associated with the advertisement, divided by a number of clicks, associated with the advertisement, at the CPC value determined for the advertisement; and dynamically updating the cost-per-click (CPC) value of the advertisement for the advertisement traffic source based on the ratio of an expected number of conversions to a number of clicks; and dynamically raising the cost-per-click (CPC) value of the advertisement when the ratio is above a targeted conversion rate and dynamically lowering the cost-per-click (CPC) value of the advertisement when the ratio is below the targeted conversion rate.

22. The method of claim 21, wherein the advertising network includes at least one of a CPC-based advertising network, a CPA-based advertising network, and a cost-per-1000 (CPM)-based advertising network.

23. The method of claim 22, further comprising:

determining a keyword associated with the advertisement; and placing the advertisement and the associated keyword on the CPC advertising network.

24. The method of claim 21, further comprising determining the CPC value for the advertisement based on a price determined to acquire a paying customer associated with the advertisement, wherein the determined price is lower than a price an advertiser is willing to pay for the customer.

25. The method of claim 21, further comprising raising the CPC value for the advertisement when the ratio is above a profit value.

26. The method of claim 21, further comprising lowering the CPC value for the advertisement when the ratio is below a profit value.

27. The method of claim 21, further comprising removing the advertisement from the advertising network when the ratio is below a profit value.

28. A computer-readable medium for providing cost-per-acquisition-based online advertising including computer-readable instructions recorded on the computer-readable medium configured to cause one or more computer processors to execute the steps comprising:

receiving a set CPA pricing for a designated action, the set CPA pricing including a targeted conversion rate, and the targeted conversion rate including a ratio of an expected number of conversions to a number of clicks of an on-line advertisement;

automatically determining a cost-per-click (CPC) value for a cost-per-acquisition (CPA)-based advertisement; and dynamically determining a ranking of the advertisement based upon the determined cost-per-click (CPC) value and the set CPA pricing;

automatically placing the advertisement on an advertising network at the determined cost-per-click (CPC), based on the dynamic ranking,
  wherein the placement of the advertisement is determined based on a ratio of an expected number of conversions, associated with the advertisement, at a cost-per-acquisition (CPA) value, associated with the advertisement, divided by a number of clicks, associated with the advertisement, at the CPC value determined for the advertisement and
dynamically updating the cost-per-click (CPC) value of the advertisement for the advertisement traffic source based on the ratio of an expected number of conversions to a number of clicks; and
dynamically raising the cost-per-click (CPC) value of the advertisement when the ratio is above a targeted conversion rate and dynamically lowering the cost-per-click (CPC) value of the advertisement when the ratio is below the targeted conversion rate.

29. A computer-implemented system for providing cost-per-acquisition-based online advertising, comprising:
  means for receiving a set CPA pricing for a designated action, the set CPA pricing including a targeted conversion rate, and the targeted conversion rate including a ratio of an expected number of conversions to a number of clicks of an on-line advertisement;
  means for automatically determining a cost-per-click (CPC) value for a cost-per-acquisition (CPA)-based advertisement; and
  means for dynamically determining a ranking of the advertisement based upon the determined cost-per-click (CPC) value and the set CPA pricing;
  means for automatically placing the advertisement on an advertising network at the determined cost-per-click (CPC), based on the dynamic ranking,
    wherein the placement of the advertisement is determined based on a ratio of an expected number of conversions, associated with the advertisement, at a cost-per-acquisition (CPA) value, associated with the advertisement, divided by a number of clicks, associated with the advertisement, at the CPC value determined for the advertisement; and
  means for dynamically updating the cost-per-click (CPC) value of the advertisement for the advertisement traffic source based on the ratio of an expected number of conversions to a number of clicks; and
  means for dynamically raising the cost-per-click (CPC) value of the advertisement when the ratio is above a targeted conversion rate and dynamically lowering the cost-per-click (CPC) value of the advertisement when the ratio is below the targeted conversion rate.

* * * * *